United States Patent
Breuer et al.

(10) Patent No.: US 10,772,039 B2
(45) Date of Patent: Sep. 8, 2020

(54) METHOD FOR CELL RESELECTION OF A WIRELESS COMMUNICATION DEVICE

(71) Applicant: GEMALTO M2M GMBH, Munich (DE)

(72) Inventors: Volker Breuer, Boetzow (DE); Lars Wehmeier, Falkensee (DE)

(73) Assignee: THALES DIS AIS DEUTSCHLAND GMBH, Munich (DE)

( * ) Notice: Subject to any disclaimer, the term of this patent is extended or adjusted under 35 U.S.C. 154(b) by 0 days.

(21) Appl. No.: 16/068,955

(22) PCT Filed: Jan. 10, 2017

(86) PCT No.: PCT/EP2017/050394
§ 371 (c)(1),
(2) Date: Jul. 10, 2018

(87) PCT Pub. No.: WO2017/121719
PCT Pub. Date: Jul. 20, 2017

(65) Prior Publication Data
US 2019/0037487 A1    Jan. 31, 2019

(30) Foreign Application Priority Data
Jan. 11, 2016 (EP) .................................... 16150806

(51) Int. Cl.
*H04W 48/20* (2009.01)
*H04W 24/08* (2009.01)
*H04W 52/02* (2009.01)

(52) U.S. Cl.
CPC ........... *H04W 48/20* (2013.01); *H04W 24/08* (2013.01); *H04W 52/0225* (2013.01);
(Continued)

(58) Field of Classification Search
CPC .. H04W 52/0225; H04W 24/08; H04W 48/20
See application file for complete search history.

(56) References Cited

U.S. PATENT DOCUMENTS

2004/0224659 A1* 11/2004 Cheng ............... H04W 52/0274
455/404.1
2013/0244657 A1* 9/2013 Wang .................... H04W 36/24
455/436
(Continued)

OTHER PUBLICATIONS

International Search Report (PCT/ISA/210) dated May 30, 2017, by the European Patent Office as the International Searching Authority for International Application No. PCT/EP2017/050394.
(Continued)

*Primary Examiner* — Kevin C. Harper
*Assistant Examiner* — Henry Baron
(74) *Attorney, Agent, or Firm* — Buchanan Ingersoll & Rooney PC

(57) ABSTRACT

A method for operating a wireless communication device in a cellular network comprises the steps of: determining power consumption criteria for at least one first time period containing at least one data transmission, carrying out a data transmission session, in case that after said data transmission session the wireless communication device has changed from a first base node to a second base node of the cellular network: determining power consumption criteria for at least one second time period containing at least one data transmission on a second base node, comparing power consumption criteria of the first time period with power consumption criteria of the second time period, carrying out a cell reselection to the first base node, in case at the first time period the determined power consumption criteria indicate a lower power consumption than at the second time period.

15 Claims, 3 Drawing Sheets

(52) U.S. Cl.
CPC .......... *Y02D 70/00* (2018.01); *Y02D 70/1262* (2018.01); *Y02D 70/21* (2018.01)

(56) References Cited

U.S. PATENT DOCUMENTS

| | | | | |
|---|---|---|---|---|
| 2013/0336199 A1* | 12/2013 | Schwartz | ........... | H04B 7/15507 370/315 |
| 2014/0032849 A1* | 1/2014 | De Vleeschauwer | ....................... | G06F 12/0862 711/133 |
| 2019/0014514 A1* | 1/2019 | Sundberg | ............. | H04W 48/20 |

OTHER PUBLICATIONS

Written Opinion (PCT/ISA/237) dated May 30, 2017, by the European Patent Office as the International Searching Authority for International Application No. PCT/EP2017/050394.

Huawei et al., "NB-IOT—Cell Selection/Reselection and Measurement", vol. RAN WG2, No. Malmo, Sweden, Oct. 4, 2015, 2 pages.

Mediatek Inc., "NB-IOT—Cell Selection and Reselection", vol. RAN WG2, No. Anaheim, USA, Nov. 16, 2015, 5 pages.

\* cited by examiner

METHOD FOR CELL RESELECTION OF A WIRELESS COMMUNICATION DEVICE

FIELD OF THE INVENTION

The present invention relates to a method for operating a wireless communication device.

The invention also pertains to a wireless communication device using said method. The invention further relates to a cellular network.

BACKGROUND OF THE INVENTION

Generally, in the field of wireless communication the concept of cell-reselection is well known and handled since the first releases of global system for mobile communications (GSM). Such conventional approaches are based on the assumption that the wireless communication devices operating in the cellular networks are mobile handsets which randomly move in the coverage area of the cellular network, or beyond, and as well randomly carry out voice resp. data connections with the cellular network and communication partners reachable over the cellular network. These approaches were mainly designed to assure connectivity for those mobile handsets.

Further the needs of the cellular networks to allow load-balancing functions was taken into account, and lead to a couple of measurement reports sent from the wireless communication devices operating in a cellular network to its serving base node, in order to cover both requirements.

With the advent of machine type communication (MTC) a couple of such boundary conditions need to be re-considered, in particular with regards to the envisaged objectives. One major objective for certain types of MTC devices is the optimization of power consumption, e.g. for metering devices operating in a field without power supply.

This leads to a natural tradeoff between the cellular network's desires for measurement reports from the wireless communication devices and the power consumption of the wireless communication devices operating in such cellular networks.

Not only the transmission of measurement reports as such needs additional power resources of the wireless communication device. The operation on a base node with worse signal strength requires for wireless communication devices, in particular those operating in enhanced coverage mode, an increased power consumption than on a better reachable base node. Hence, would the cellular network in an attempt to carry out load balancing functions push a MTC device to a base node with worse signal strength, this would inevitably lead to higher power consumption. Without indication by the wireless communication device, e.g. by means of measurement reports, this situation is not known to the cellular network.

An extreme case applies for stationary wireless communication device, which is in particular foreseen in the definition of NB-IOT, a new narrowband radio technology to address the requirements of the Internet of Things (IoT) currently under standardization by ETSI. Such wireless communication devices would in a stable cellular network need no cell-reselection related measurements, and consequently no measurement reports to be sent to the cellular network at all. This situation also applies for devices with low mobility or regular predictable movement profiles.

Especially for stationary wireless communication devices the reselection should not be based on momentary received signal quality measurements only, as the situation is static and no fast reselection is required in order not to lose coverage.

But would all such wireless communication devices, for which a vast amount is expected in the market overviews, only orientate on its own measurements and thus stay on the base node with best signal strength, this could lead to an unbalance or even overflow situation for the cellular network.

Therefore, there is a need for a mechanism that fulfills both the power consumption objectives of the wireless communication devices and on the other hand the need for an effective load balancing by the cellular networks.

It is therefore the goal of present invention to overcome the mentioned disadvantages and to propose a solution for an improved cell-reselection method for the wireless communication device.

Further alternative and advantageous solutions would, accordingly, be desirable in the art.

SUMMARY OF THE INVENTION

For this it is according to a first aspect of the invention suggested a method to operate a wireless communication device according to claim 1. It is further suggested according to a second aspect of the invention a wireless communication device according to claim 10. Further it is proposed a cellular network according to claim 15.

According to the first aspect of the invention it is proposed a method for operating a wireless communication device in a cellular network by operating with a first base node of the cellular network, the method comprises the steps for the wireless communication device of:

determining power consumption criteria for at least one first time period containing at least one data transmission, carrying out a data transmission session, in case that after said data transmission session the wireless communication device has changed from the first base node to a second base node of the cellular network:

determining power consumption criteria for at least one second time period containing at least one data transmission on a second base node, comparing power consumption criteria of the first time period with power consumption criteria of the second time period, carrying out a cell reselection to the first base node, in case at the first time period the determined power consumption criteria indicate a lower power consumption than at the second time period.

The inventive method relates to a wireless communication device operating in a cellular network, in particular operating under the so-called 4G standard Long Term Evolution (LTE), or derivations thereof, including LTE-M, NB-IOT etc.

Such cellular network comprises a plurality of base nodes, preferably eNodeBs, that are the cellular network's end points of the connection over the air interface with the wireless communication device. Furthermore the cellular network typically comprises more components, in that sense when method steps from the cellular network are mentioned these are effectively carried out by the base nodes or said other components of the cellular network.

The wireless communication device is expected to have registered on the cellular network on a first base node. The base node, the wireless communication device is camping on is the so-called serving base node.

The wireless communication device is in particular a device which is regularly carrying out a data transmission session. Such a data transmission session has either the purpose of sending data from the wireless communication device to the serving base node (uplink), or vice versa (downlink), or both. Typically such a data transmission session is initiated by the wireless communication device, in particular after a time or event trigger activated.

The wireless communication device is in particular operated with a battery and as such focused on connection conditions which require as low power consumption as possible. For a wireless communication device configured to operate only in LTE, this means to optimize the connection conditions intra-RAT.

For doing so the wireless communication device is configured to determine the power consumption of regular data transmission. Preferably the wireless communication device conducts data transmissions regularly based on a time trigger, in particular once a day or once a week. Hence, depending on the time trigger configuration one time period with at least one data transmission is defined.

Preferably data transmission is one of a plurality of periodic data transmission of at least one of the same size.

With that preferable embodiment it is assured that the data transmission requires the same time and such each data transmission is comparable with the next one. Effectively, the accuracy of the inventive method is increased by applying this embodiment.

For at least one time period a power consumption footprint is ascertained by determining power consumption criteria.

Preferably the power consumption criteria are based on at least one of:
  coverage enhancement repetitions,
  coverage enhancement level,
  HARQ repetitions,
  mean power consumption for at least one data transmission,
  received signal strength of the base node,
  path-loss,
  accumulated receive time including data confirmations and listening to paging occasions,
  number of paging occasions.

One or more of these power consumption criteria might be used and in the end result in a value depicting the power consumption.

Depending upon the type of wireless communication device such power consumption criteria apply.

In particular for a wireless communication device configured to operate in enhanced coverage mode the proposed power consumption criteria of coverage enhancement repetitions and/or coverage enhancement level apply. Enhanced coverage mode is a mode, in particular for MTC devices, where bad signalling conditions are mitigated by repetitions of the signals that are accumulated until enough signalling power is received The number of repetitions needed for gaining enough signalling power for reliably decoding of the transmitted signals directly influences the power consumption as each repetition needs a certain quota of power.

When the enhanced coverage repetitions are translated in levels, that is coverage enhancement level, then the power consumption is dependent on the coverage enhancement level.

Not only for enhanced coverage but also common wireless communication devices operating in LTE cellular networks also the HARQ (hybrid automatic repeat request) rate is another power consumption criterion. That is the number of repetitions needed in conjunction with the HARQ mechanism, that is if transmitted data are not properly acknowledged by the receiver, then the transmitted is requested to transmit at least parts of the data block again. The HARQ rate or number of HARQ repetitions for a data transmission are also an indicator for the quality of the data connection, but also influence the power consumption footprint of a data transmission time period.

The signal strength and/or the path-loss also directly influence the power consumption, that is the better the signal strength resp. the lower the path-loss, the lower is the power consumption for the same data transmission.

Further it is advantageous to consider the accumulated receive time of the wireless communication device during said time period. This in particular includes data confirmations and listening to paging occasions. The longer the time where the wireless communication device is ready and awake to receive data, the more power is consumed.

This also directly applies to the number of noticed paging occasions, as this urges the wireless communication to be awake to receive the pagings.

Finally direct means for measuring power consumption for at least one data transmission, in particular when the load status of the battery can be determined in sufficient resolution and accuracy, are preferably also taken into account.

Generally the determined power consumption criteria need to be comparable, hence it is preferable to carry out said determination step of the power consumption criteria for at least one time period in the same manner. Preferably these power consumption criteria are determined for a plurality of time periods containing at least one data transmission.

With this row of measurements per time period, an average power consumption for one time period resp. data transmission is determined. Preferably the row of measurements for calculating the average power consumption value has a defined length, e.g. each 10 data transmission. That is for a wireless communication device transmitting one data packet per day, after 10 days an average of power consumption criteria is determined. The determined power consumption criteria resp. the average power consumption criteria is stored that way, that it is accessible after the next cell reselection.

The inventive method proceeds with the next data transmission session. In conjunction with the data transmission session a connection is set up, measurements are typically carried out and messages received from the serving base node.

After said data transmission session the wireless communication device might have changed from the serving first base node to a second base node of the cellular network.

In a first embodiment the change from the first base node to the second base node is carried out in response to a reception of a re-direction signal transmitted from the first base node.

A LTE cellular network has in this scenario no means of load balancing between its base nodes than by a RRC re-direct (radio resource control), which applies to a wireless communication device operating in LTE RRC connected state. With a RRC connection release with re-direct the base node can instruct the wireless communication device to end the connection with the current base node and camp on another base node, or the same base node on a different frequency range resp. frame.

In particular the RRC re-direction is a blind re-direction, as it expects no additional measurement reports from the wireless communication devices. In a second embodiment the change from the first base node to the second base node is carried out in response to neighbor cell measurements of the wireless communication device at at least one time period, wherein the cell measurements fulfill at least one criterion being lower than the standard cell-reselection criteria.

In conjunction with the connection session the wireless communication device carries out a couple of measurements and might find another base node more suitable by a certain threshold of cell reselection criteria than the current serving base node and hence make a cell reselection.

This might in particular be the case due to a change in network topology, e.g. a new introduced base node.

Preferably this change is also carried out without fulfilling the cell reselection threshold but with the intent to check for better power consumption conditions.

The change from the first base node to the second base node might also comprise a change from a first frequency range of a base node to a second frequency range of the same base node.

For the case of NB-IOT the change from the first base node to the second base node might also comprise a change from a first narrow band carrier of the base node to a second narrow band carrier of the same base node. This might in particular be the case following the introduction of another narrow band carrier on the base node for NB-IOT wireless communication devices.

When the change from the first base node to the second base node is carried out, the wireless communication device is camping on the second base node for at least a while. During this period it continues to conduct its data transmission session as it did before, as the time trigger is not affected by the cell reselection procedure.

Therefore it is proposed to carry out the determination of power consumption criteria also for a time period containing at least one data transmission by means of the second base node.

With at least one determination of power consumption criteria, but preferably with another row of determinations leading to average power consumption criteria now the wireless communication device is in the position to detect, if the power consumption on the second base node is higher or lower than when camping on the first base node. For doing so the stored power consumption criteria from the first base node are accessed and compared with the just determined power consumption criteria of the second base node.

Should it be the case that the power consumption of the second base node is higher than that of the first base node, then the wireless communication device would carry out a cell reselection to the first base node. This is in order to return to connection conditions with better power consumption footprint.

With that inventive method it is preferably achieved the goal for the wireless communication device to improve the power consumption footprint despite re-direction instructions from the cellular network. Further the need of additional measurement reports sent to the base node are omitted and as such save a lot of power.

In a preferred embodiment it is proposed that the comparison takes into account a predefined reselection power threshold, wherein the cell reselection is only carried out if the power consumption of the second base node is higher by said reselection power threshold than the power consumption of the first base node.

With this embodiment it is prevented that with minimal differences of power consumption a cell reselection is carried out, which requires additional power. Also a ping-pong effect due to low measurement differences or inaccuracies is prevented by this embodiment.

Preferably the reselection power threshold is defined in dB, as this value can be translated in other power consumption criteria, e.g. enhanced coverage repetition rate.

In another preferred embodiment the reselection power threshold is updated based on a signal received at the wireless communication device from the cellular network.

With this embodiment the cellular network comes into play and has means to influence the behavior of the wireless communication devices operating according to the proposed method.

As the cellular network has the need to carry out load balancing on its base nodes and on the frequency ranges of its base nodes, it needs the possibility to distribute the camping wireless communication device appropriately by means of instructions.

The main instruction is the mentioned RRC re-direct message in conjunction with a RRC connect state. But while the wireless communication devices receiving the re-direct message might after a while return to their previously used base nodes, when they find the power consumption conditions worse than before, hence the cellular networks needs controls to overrule such behavior.

This control is the reselection power threshold which is transmitted on a dedicated channel or via broadcast e.g. SIBs (system information blocks).

With an increase of the reselection power threshold, the wireless communication device need in the comparison step of the suggested method to find a higher difference between the power consumption criteria of the first base node and the second base node, in order to carry out the cell reselection to the first base node.

Provided the situation occurs that a plurality of wireless communication devices are positioned around one base node, and the neighbor base node is still in a reachable area for most of the wireless communication devices, but further away. After a while all wireless communication devices would camp on the first base node. When the cellular network urges the base node to send re-direct messages to a subset of the wireless communication devices, then for a short time they would follow this instruction. But depending upon the reselection power threshold the majority might return. Hence, the higher the reselection power threshold is set, the more wireless communication devices remain on the assigned second base node.

The preferred range of the reselection power threshold is higher than 0 dB and lower than the 6 dB for cell reselection.

In another preferred embodiment it is proposed the wireless communication device is further operating with a predictable location profile, whereby the predictable location profile comprises:
  a stationary wireless communication device or
  a wireless communication device with low mobility, which is moving within the serving base nodes' cell area,
  a wireless communication device which moves in a repeated manner.

With that embodiment it is ensured that the determined power consumption criteria are comparable.

This is preferably the case when the wireless communication device is stationary, that is not moving at all. This typically applies to metering devices installed in basements of houses.

This is further preferably the case for wireless communication devices operating in low mobility, that is within the range of the serving base nodes cell area no cell reselections are needed due to unreachability of the originally serving base node, like it is the case for mobile handsets or devices built in vehicles. This applies in particular to POS devices which are only handled in and around a certain location like restaurant or shop.

Finally wireless communication devices moving in a repeated manner are preferably capable of conducting the proposed method. Those wireless communication devices have a certain track where they move, e.g. in elevators or automated systems. So these wireless communication devices are not stationary in a narrow sense, but their movement is predictable. The time trigger for data transmissions is preferably aligned with such predictable movement and hence the data transmission is always happening at considerably the same location.

According to another aspect of the invention it is proposed a wireless communication device operating in a cellular network with a first base node of the cellular network, configured to determine power consumption criteria for at least one first time period containing at least one data transmission, carry out a data transmission session, in case after said data transmission session the wireless communication device has changed from the first base node to a second base node of the cellular network:

determine power consumption criteria for at least one second time period containing at least one data transmission on a second time period, compare power consumption criteria of the first time period with power consumption criteria of the second time period, carry out a cell reselection to the first base node in case at the first time period the determined power consumption criteria indicate a lower power consumption than at the second time period.

This aspect of the invention shares the advantages of the first aspect.

According to a third aspect of the invention it is suggested a cellular network for wireless communication, comprising of a plurality of base nodes configured to each operate a plurality of wireless communication devices, configured to re-direct in conjunction with a data transmission session from a wireless communication device from the first base node to the second base node, wherein the re-direction is carried out in response to a change in the network topology.

This aspect of the invention applies to the cellular network, where the wireless communication device is operating in.

The cellular network comprises a plurality of base nodes. In the case of a cellular network supporting the LTE technology standard, the base nodes are eNodeBs.

Further components of the cellular network are possible. Hence, when in the following measures are said to be carried out by the cellular network, this might apply to certain of these components, including the base nodes.

The cellular network is configured to transmit re-direction instructions, in particular RRC re-directs to at least one wireless communication device.

The RRC re-direct is in conjunction with a wireless communication device operating in RRC connection the preferred option to carry out a cell change, as in particular in the context of NB-IOT handovers are not available. Additionally differences between base nodes which do not lead to a cell reselection due to reselection criteria are not met. Hence, with an RRC connection release message also a re-direct to another base node is possible to be carried out.

Due to the fact that no measurements from the wireless communication devices are needed, the RRC re-direct are so-called blind re-directs. That means, they are carried out under the awareness that a wireless communication device for which the second base node is not suitable, would carry out a reselection immediately. Further for those wireless communication devices, where the second base node is suitable, but another base node, in particular the first base node, is better suitable by 6 dB, would return to the first base node as well.

Hence, even though a blind re-direct is carried out, the wireless communication devices make sure to camp on a base node where they are able to properly operate with.

In this preferred embodiment this RRC re-direct is carried out in conjunction with a change in network topology, that is an addition or removal of a base node of the cellular network. That means, that internal reasons of the cellular network trigger the transmission of the RRC re-direct.

A further option is a detection of cellular network's load imbalances. When such an imbalance is detected the cellular network is configured to send to a subset of wireless communication devices camping on overloaded base nodes a RRC re-direct in order to balance the load among the plurality of base nodes.

It can be seen that the RRC re-direct for improving the load balancing of the cellular network does not require measurement report received from the wireless communication device.

According to a preferred embodiment it is proposed that the cellular network is further configured to detect load differences between at least two of the plurality of base nodes, and in case of a detected load difference transmit a message indicating a reselection power threshold to at least one of the wireless communication devices operating with one of the at least two base nodes.

This embodiment comprises the update of the reselection power threshold by the cellular network towards the wireless communication devices.

Should the cellular network detect, that after sending RRC re-directs to a couple of wireless communication devices camping on a first base node, that within a certain amount of time a certain share of these wireless communication devices decide to return to the original first base node, then the cellular network needs to influence the behavior of the wireless communication devices.

For that the reselection power threshold is foreseen. Is this reselection power threshold too low, then more wireless communication devices implementing the method according to the first aspect of the invention are able to return to base nodes with better power consumption conditions. Only an increased reselection power threshold prevents them from doing so.

Hence, cellular network needs to have means for detecting the preconditions and the load conditions, in particular over a certain amount of time. Preferably for the outcome of sending out re-direction instructions to wireless communication devices is monitored over a couple of days.

For that the cellular network needs information about on which base node the re-directed wireless communication devices are camping.

This is in particular the case when it is known that these wireless communication devices regularly carry out data transmission sessions. So, when in a time period following the re-direct message a certain share of wireless communication devices carries out one of the next data transmission sessions on the first base node again, where they were camping on before the re-direction instruction was sent, then the cellular network gets aware of the camping situation. Consequently the cellular network preferably sends out a signal indicating the increase of the reselection power threshold.

With this option additional measurements reports are omitted. Alternatively an additional message type following a cell reselection could by introduced, when the wireless communication device is not expected to carry out data transmissions for a certain amount of time.

The reselection power threshold update is preferably transmitted as part of SIBs (system information blocks), resp. M-SIBs.

Further following the update of the reselection power threshold, the cellular network preferably initiates sending another re-direction instructions to the wireless communication devices that returned to the original base node following the last re-direction instruction transmission.

As it is shown this invention advantageously reaches the envisaged goal by taking into account the objectives of the wireless communication devices and the cellular network.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a first and second wireless communication device UE1 and UE2 of the type to which the present invention is applied as an embodiment. Further it is shown two base nodes BS1 and BS2 belonging to a cellular network 1. Both base nodes are situated in this embodiment in a certain spatial situation, and thus cover different cell areas. Further it is shown with arrows 10 the air interface link between wireless communication devices and base nodes shown. The thickness of the arrows indicates the received signal strength at the wireless communication device, under the assumption of equal signal transmission strength.

Figure 1:
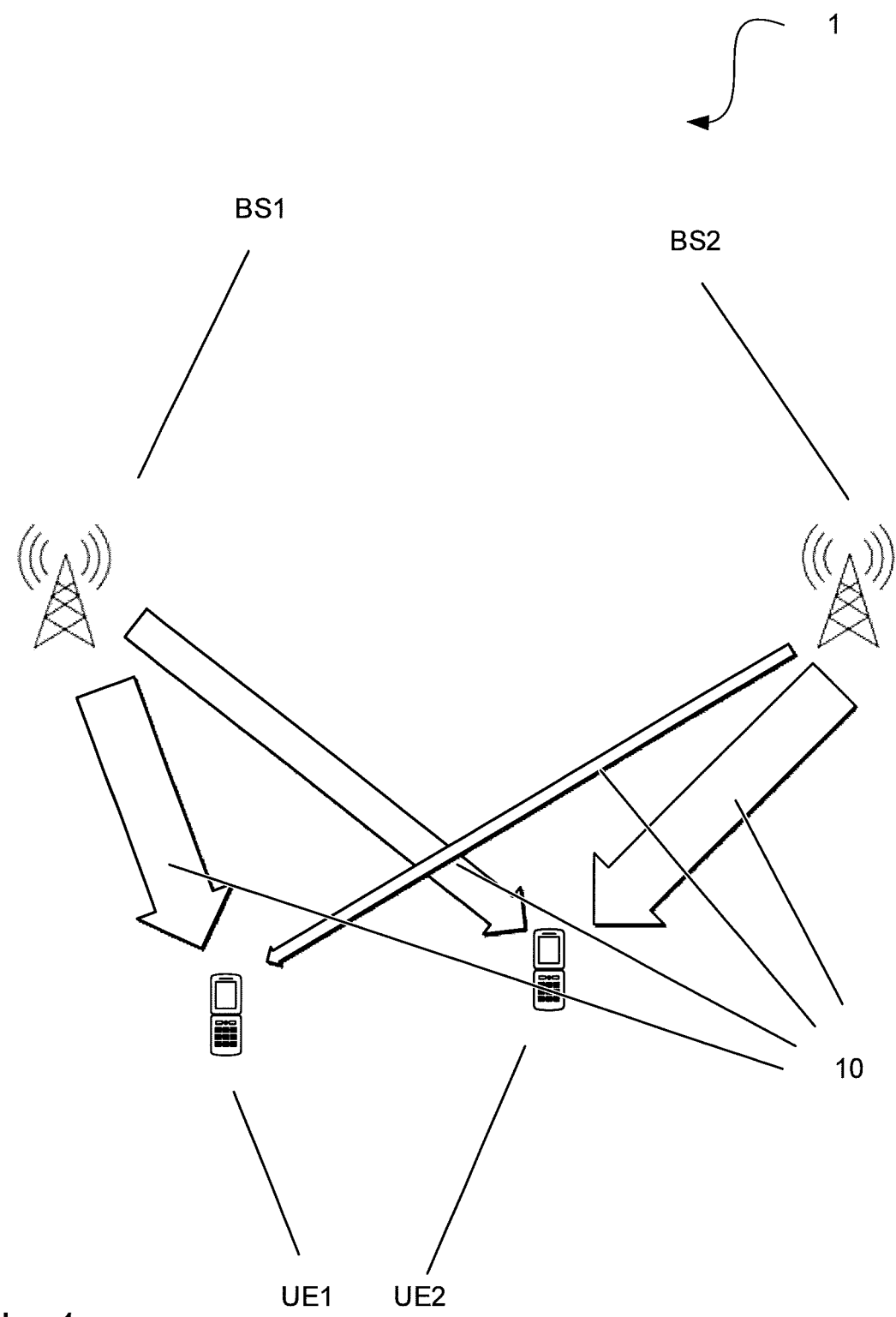
FIG. 1 represents the spatial situation of two wireless communication devices of the type to which the present invention is applied as an embodiment in relationship to two base nodes of the cellular network.

Wireless communication device UE1 is situated closer to base node BS1, hence the signal strength is stronger than in comparison with the signal strength of base node BS2.

Wireless communication device UE2 is situated somewhat closer to base node BS2, hence the signal strength is stronger than in comparison with the signal strength of base node BS1. Nevertheless, the signals of BS1 is received at wireless communication device UE2 still in an acceptable signal strength.

The following considerations are made under the provision that the wireless communication device UE2 is operated stationary, and also the cellular network topology does not change, that means no new base node is introduced and base nodes BS1 and BS2 continue operating without degradations. In particular it is assumed that the wireless communication device UE2 is a metering device which regularly, e.g. once a day, sends measuring results of the meter with a defined message to a remote server via the cellular network 1.

Would wireless communication device UE2 decide based on autonomous measurements it would decide to camp on BS2, as this has the better signal strength.

However, should the wireless communication device UE2 camp on base node BS1, then for a cell-reselection from base node BS1 to BS2 it would require a received signal strength of BS2 which is higher by a cell reselection threshold predefined by the cellular network, typically 3-6 dB (preferably depending on received signal level) than that of the currently serving base node BS1. This mechanism is described in particular in TS36.133/TS36.304.

Provided the wireless communication device camps upon registration first on the better base node BS1. Through load balancing mechanisms the cellular network intends to push some wireless communication devices camping on base node BS1 to BS2, in particular due to the fact that remarkably more wireless communication devices are camping on base node BS1 than on base node BS2.

One preferred mechanism is the so-called RRC re-direction message. This is a message transmitted from the serving base node BS1 in conjunction with a data transmission session, that is in connected mode, to the wireless communication device. With that message the wireless communication device is urged to camp on another base node, in this example on base node BS2.

When the cellular network, resp. the serving base node BS1 does not receive any measurement reports from the camping wireless communication devices, then the cellular network cannot estimate, which of the wireless communication devices are in a better position to camp on base node BS2. As each re-directed wireless communication device is carrying out measurements relating to cell-reselection, after being re-directed, it will return to the original base node BS1, under the condition it is better suitable than the currently serving base node BS2 by said cell reselection threshold. Should this condition not apply, the wireless communication device would remain on base node BS2, although the signalling conditions are remarkably worse than on base node BS1.

Now it is assumed that the wireless communication device UE2 is operating in enhanced coverage mode, that is a mode for MTC devices, where bad signalling conditions are mitigated by repetitions of the signals that are accumulated until enough signalling power is received. Through this mechanism the demodulation performance is increased by up to 20 dB.

As each repetition requires power, over a certain amount of time with a regular data transmission, this increase in repetitions would result in a remarkable increase in power consumption for the wireless communication device UE2.

But also for normal coverage mode wireless communication devices the worse signalling conditions would mean an increase of power consumptions, in particular with an increased number of repetitions caused by HARQ-process/-es and an increase of transmission power for data transmission events.

Figure 2:
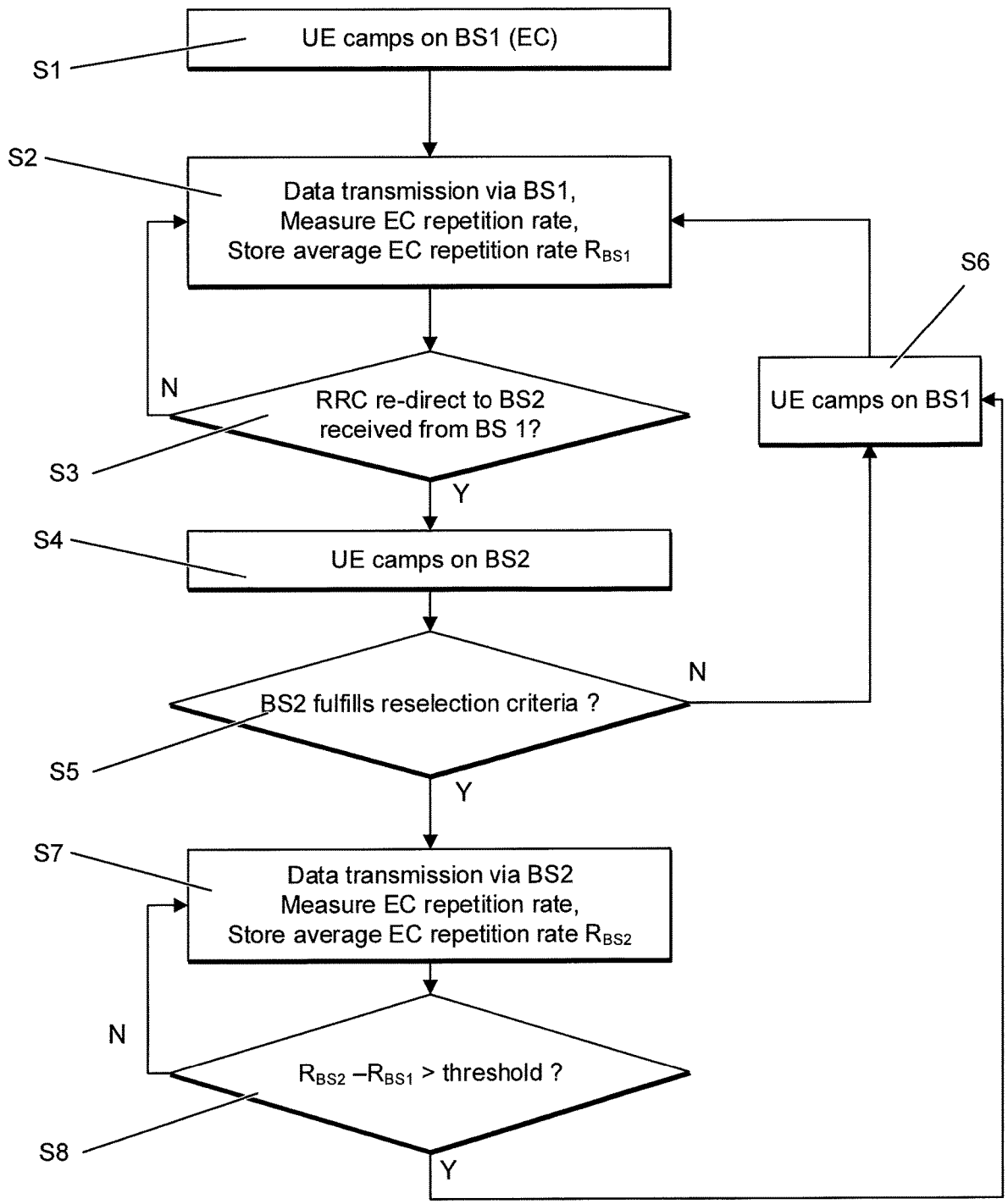
FIG. 2 shows a flow chart of an advantageous embodiment of the present inventive method.

The flow chart in FIG. 2 shows for the described situation a preferred embodiment of the inventive method for cell reselection and still taking into account the cellular networks objectives.

The wireless communication device (UE) of this embodiment is operating in enhanced coverage. It is preferably a sensor device or the like which regularly, in particular once a day, sends sensing data to a remote server by means of the cellular network.

The process flow starts in step S1 with the wireless communication device camping on a base node BS1 of the cellular network, where the wireless communication device is eligible for operating in. The wireless communication device is operating in enhanced coverage with the base node BS1. That presumes that the base node is also capable to support enhanced coverage mode.

After a time trigger for data transmissions has expired step S2 is carried out where first a data transmission, in particular of sensing data to the remote server. As the wireless communication device is operating in enhanced coverage mode, it needs a couple of repetitions for submitting the data packet to the base node. Hence, the EC repetition rate is noted as a power consumption criterion by the wireless communication device.

Preferably the data packet is always of the same size, in particular in terms of bytes. This is in particular true for metering devices sending each measurement result in a data packet. The data packet then has a defined size, both in terms of payload and overhead signalling.

Further as part of this step the wireless communication device stores an average of EC repetition rates for base node BS1, denominated $R_{BS1}$. This average of EC repetition rates is calculated based on all or a given number of recently measured EC repetition rates. This value $R_{BS1}$ is stored in the wireless communication device.

As part of the data transmission the base node BS1 could send a RRC re-direct message to the wireless communication device. In step S3 is tested if such a RRC-direct message is found. If not, the procedure returns to step S2, which starts after expiration of the time trigger again with the next data transmission.

If a RRC re-direct message is received from base node BS1, then in step S4 the wireless communication device is following this instruction and camps on the destination base node BS2, which is preferably depicted in the RRC re-direct message.

The wireless communication device checks if the new serving base node BS2 is fulfilling the suitability criteria in step S5. If not, the wireless communication device checks for a cell reselection, and if the previous base node BS1 has a signal strength higher than signal strength from base node BS2 by the cell reselection threshold, then the wireless communication device carries out a cell-reselection to base node BS1, and consequently camps on base node BS1, as indicated in step S6.

If however the new serving base node BS2 is suitable, nevertheless the wireless communication device checks for a cell reselection, and if the condition above applies, then the cell reselection to base node BS1 is carried out as well. Preferably both steps are checked altogether, but it is also encompassed by this embodiment of the invention that the suitability check is carried out first, and later the cell-reselection check is conducted separately. If none of the conditions in step S5 applies, the wireless communication device remains for the time being on base node BS2 and continues operation there.

Hence, if the time trigger mentioned above in conjunction with step S2 expires, again a data transmission is carried out, but now by means of base node BS2.

Consequently also the EC repetition rate is measured for base node BS2, and an average EC repetition for base node BS2, denominated $R_{BS2}$ is calculated and stored.

After a certain amount of data transmissions, e.g. in case of daily measurement preferably for a week or so, the average EC repetition rate $R_{BS2}$ gets sufficient relevance. Hence it is comparable with the average EC repetition rate $R_{BS1}$.

In step S8 it is then, in particular after a certain amount of data transmission in step S7, compared the average EC repetition rates of both base nodes, $R_{BS1}$ and $R_{BS2}$. Should the repetition rate of the base node BS2 be higher than that of base node BS1 by a given reselection power threshold, then this is an indication that the wireless communication device consumes too much power on this base node.

Consequently in this case the process flow branches to step S6, which means the wireless communication device carries out a reselection to base node BS1 again.

If the comparison of the EC repetition rates is below the reselection power threshold, then the procedure returns to step S7. For the completeness sake it needs to be mentioned that also from base node BS1 a RRC re-direct could be signaled to the wireless communication device, including one to a third base node. Consequently the wireless communication device would follow this instruction, as indicated in step S3 for base node BS1. Out of simplicity reasons this step is omitted in FIG. 2.

The EC repetition rate in this embodiment is a representative of the power consumption criteria with each data transmission. Typically the repetition rate can be converted in a certain dB figure, and such indicate the required power.

Figure 3:
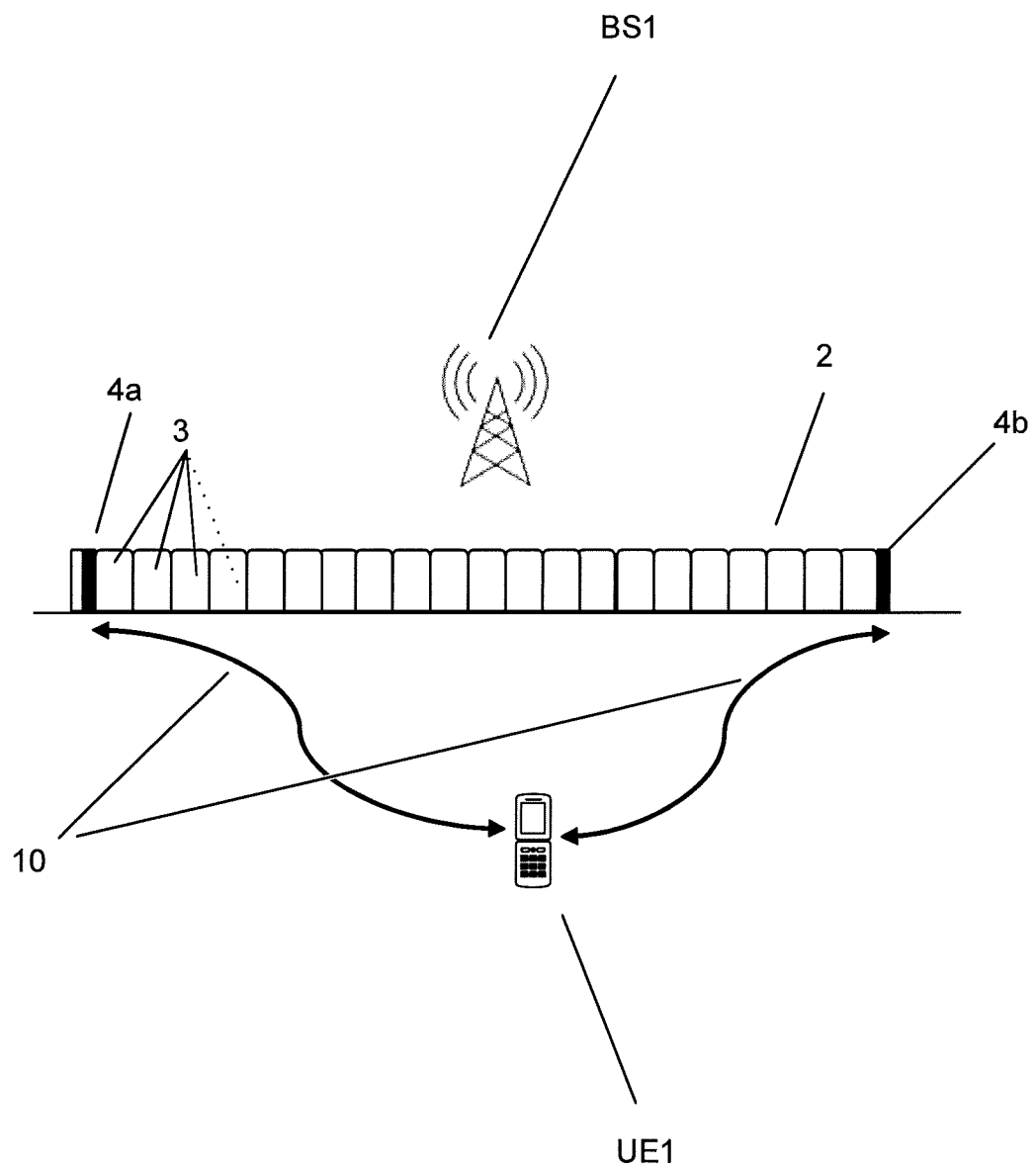
FIG. 3 shows a wireless communication device in spatial situation to a base node supporting narrowband carriers.

As such, the wireless communication device has an indication about the power it would consume when operating with the serving base node, and can compare it to the power it would consume when operating with another suitable base node. Other criteria could preferably also used for that purpose. In FIG. 3 it is depicted the situation of a wireless communication device UE1 operating in NB-IOT mode. The wireless communication device is camping on base node BS1. This base node provides for the case of LTE at least one frequency bandwidth 2 covering an LTE band, distributed on a plurality of subcarriers 3 or resource blocks, and additional band ranges (i.e. guard bands) at the edge of the frequency band. The base node is configured to support NB-IOT by means of adding one or more narrow band frames 4a, 4b in said additional band ranges or within the frequency range of the operating band.

A narrow band supporting wireless communication device UE1 is camping on one narrow band frame of the base node. E.g. on this base node the wireless communication device could camp on narrow band frame 4a, which has a lower frequency than narrow band frame 4b at the upper end of the frequency range. Hence a switch to the narrow band frame 4b is carried out by a cell-reselection.

It is clear that from the propagation conditions the both narrow band frames of the same base node BS1 to the same stationary wireless communication device UE1 are equal. The only difference is the frequency of the narrow band frames 4a, 4b.

For the wireless communication device UE1 the narrow band frame 4a with the lower frequency is advantageous in terms of signal strength and power consumption, as lower frequencies have a longer range.

On the other hand, with common cell-reselection mechanisms the wireless communication device BS1 camping on narrow band frame 4b would not carry out a reselection to narrow band frame 4a, as the difference in signal strength are too low, by far below the usual threshold of 6 dB.

But for the inventive method described before, in particular shown in FIG. 2, there could be the situation that too many wireless communication devices are camping on narrow band frame 4a, and hence through RRC re-direct mechanisms the base node BS1 informs a subset of these to camp on narrow band frame 4b.

After doing so, the addressed wireless communication devices, in particular the wireless communication device UE1 shown in FIG. 3 follow the re-direction instruction. Here—according to the inventive method—for a couple of time periods, in particular each including at least one data transmission, the wireless communication device calculates an average power consumption rate per data transmission. This is in particular significant with the same size of transmitted date per data transmission session.

The wireless communication device then investigates, if the average power consumption rate on narrow band frame 4b is higher than the average power consumption rate on previous narrow band frame 4a. If so, a reselection to the previous narrow band frame 4a is possible, provided the reselection power threshold is rather low.

This situation is not advantageous for the base node BS1 due to the fact that with a low threshold a plurality, if not all re-directed wireless communication devices would return to the original narrow band frame 4a with the lower frequency.

Therefore there is a need for means on the side of the cellular network, resp. the base node BS1 to influence this behavior. According to a preferred embodiment of the inventive method it is therefore suggested that the base node is configured to send an update of the reselection power threshold to the camping wireless communication devices. Preferably this is done in conjunction with a messaging on occasion of a data transmission, e.g. together with the re-direct instruction. Another option would be a broadcast, in particular in the system information blocks (SIBs). Preferably the system information blocks reserved for MTC devices or NB-IOT devices is used for such an update of the reselection power threshold.

With an increase of the reselection power threshold the likelihood of a wireless communication device to return to the original narrow band frame after a RRC re-direct instruction from the base node BS1 is reduced, and in the end the base node successfully can carry out its load balancing task.

As it can be seen, with this advantageous embodiment the inventive method both serves the power saving needs of the wireless communication devices and the load balancing needs of the base nodes resp. the cellular network. And all this is achieved with saving additional efforts of measurement reports from the wireless communication devices to the base node.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for operating a wireless communication device in a cellular network by operating with a first base node of the cellular network, the method comprises the steps for the wireless communication device of:
    operating the wireless communication device in enhanced coverage mode;
    determining power consumption criteria, based on at least coverage enhancement repetitions, associated with at least one first time period containing at least one data transmission,
    after carrying out a data transmission session, switching the wireless communication device from operating with the first base node to operating with a second base node of the cellular network;
    determining power consumption criteria, based on at least coverage enhancement repetitions, associated with at least one second time period containing at least one data transmission on the second base node, wherein said second time period occurs after said first time period and is equal in length to the first time period;
    comparing the power consumption criteria, based on the at least coverage enhancement repetitions, associated with the first time period, with the power consumption criteria, based on the at least coverage enhancement repetitions, associated with the second time period;
    upon determining, based on said comparison, that the power consumption criteria, associated with the first time period, indicates a lower power consumption than that associated with the second time period, carrying out a cell reselection to the first base node.

2. Method according to claim 1, wherein the switch from the first base node to the second base node is carried out in response to a reception of a re-direction signal transmitted from the first base node.

3. Method according to claim 1, wherein the switch from the first base node to the second base node is carried out in response to neighbor cell measurements of the wireless communication device during at least one time period, wherein the cell measurements fulfill at least one criterion being lower than the standard cell-reselection criteria.

4. Method according to claim 1, wherein the wireless communication device is further operating with a predictable location profile, whereby the predictable location profile comprises:
    a stationary wireless communication device or
    a wireless communication device with low mobility, which is moving within the serving base nodes' cell area,
    a wireless communication device which moves in a repeated manner.

5. Method according to claim 1, wherein the data transmission is one of a plurality of periodic data transmission of at least one of the same size.

6. Method according to claim 1, wherein the power consumption criteria are further based on at least one of:
    coverage enhancement level,
    HARQ repetitions,
    mean power consumption for at least one data transmission,
    received signal strength of the base node,
    path-loss,
    accumulated receive time including data confirmations and listening to paging occasions,
    number of paging occasions.

7. Method according to claim 1, wherein the comparison takes into account a predefined reselection power threshold, wherein the cell reselection is only carried out if the power consumption of the second base node is higher by said reselection power threshold than the power consumption of the first base node.

8. Method according to claim 7, wherein the reselection power threshold is updated based on a signal received at the wireless communication device from the cellular network.

9. Wireless communication device operating in a cellular network with a first base node of the cellular network, configured to
operate in enhanced coverage mode;
determine power consumption criteria, based on at least coverage enhancement repetitions, associated with at least one first time period containing at least one data transmission;
carry out a data transmission session;
switch from operating with the first base node to operating with a second base node of the cellular network, after carrying out the data transmission session;
determine power consumption criteria, based on at least coverage enhancement repetitions, associated with at least one second time period containing at least one data transmission on the second base node, wherein said second time period occurs after said first time period and is equal in length to the first time period;
compare the power consumption criteria, based on the at least coverage enhancement repetitions, associated with the first time period with the power consumption criteria, based on the at least coverage enhancement repetitions, associated with the second time period;
carry out a cell reselection to the first base node upon determining, based on said comparison, that the power consumption criteria, associated with the first time period, indicates a lower power consumption than that associated with the second time period.

10. Wireless communication device according to claim 9 wherein the switch from the first base node to the second base node is carried out in response to a reception of a re-direction signal transmitted from the first base node.

11. Wireless communication device according to claim 9, configured to operate with a predictable location profile, wherein the predictable location profile comprises:
the wireless communication device being stationary, or the wireless communication device with low mobility, which is moving within the serving base nodes' cell area,
the wireless communication device being configured to move in a repeated manner.

12. Wireless communication device according to claim 9, wherein the power consumption criteria are further based on at least one of:
HARQ repetitions,
mean power consumption for at least one data transmission,
received signal strength of the base node,
path-loss,
accumulated receive time including data confirmations and listening to paging occasions,
number of paging occasions,
coverage enhancement level.

13. Wireless communication device according to claim 9, further configured to take into account for the comparison of power comparison criteria a predefined reselection power threshold,
wherein the cell reselection is only carried out if the power consumption of the second base node is higher by said reselection power threshold than the power consumption of the first base node, and where wireless communication device is further configured to update the reselection power threshold based on a signal received from the cellular network.

14. Cellular network for wireless communication, comprising of a plurality of base nodes configured to each operate a plurality of wireless communication devices, configured to re-direct in conjunction with a data transmission session from a wireless communication device from the first base node to the second base node, wherein the re-direction is carried out in response to a change in the network topology.

15. Cellular network according to claim 14, further configured to detect load differences between at least two of the plurality of base nodes, and in case of a detected load difference transmit a message indicating a reselection power threshold to at least one of the wireless communication devices operating with one of the at least two base nodes.

* * * * *